United States Patent
Chon et al.

(10) Patent No.: US 12,556,740 B2
(45) Date of Patent: Feb. 17, 2026

(54) SUBJECTIVE DISTORTION METRIC FOR RATE DISTORTION DETERMINATIONS

(71) Applicant: Apple Inc., Cupertino, CA (US)

(72) Inventors: Jaehong Chon, San Diego, CA (US); Athanasios Leontaris, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 18/411,740

(22) Filed: Jan. 12, 2024

(65) Prior Publication Data
US 2025/0113054 A1    Apr. 3, 2025

(30) Foreign Application Priority Data
Sep. 29, 2023    (GR) .............................. 20230100789

(51) Int. Cl.
| | |
|---|---|
| *H04N 19/573* | (2014.01) |
| *H04N 19/105* | (2014.01) |
| *H04N 19/117* | (2014.01) |
| *H04N 19/147* | (2014.01) |
| *H04N 19/172* | (2014.01) |
| *H04N 19/196* | (2014.01) |

(52) U.S. Cl.
CPC ......... *H04N 19/573* (2014.11); *H04N 19/105* (2014.11); *H04N 19/117* (2014.11); *H04N 19/147* (2014.11); *H04N 19/172* (2014.11); *H04N 19/196* (2014.11)

(58) Field of Classification Search
CPC .. H04N 19/105; H04N 19/117; H04N 19/147; H04N 19/172; H04N 19/196; H04N 19/573
See application file for complete search history.

(56) References Cited

U.S. PATENT DOCUMENTS

| | | |
|---|---|---|
| 9,621,917 B2 | 4/2017 | Kottke et al. |
| 10,187,655 B2 | 1/2019 | Chou et al. |
| 11,330,296 B2 | 5/2022 | Cote et al. |
| 2005/0232499 A1 | 10/2005 | Ha et al. |
| 2005/0276328 A1 | 12/2005 | Sakamoto |
| 2007/0071104 A1 | 3/2007 | Kondo |
| 2007/0171981 A1 | 7/2007 | Qi |
| 2007/0237232 A1 | 10/2007 | Chang et al. |
| 2008/0107307 A1 | 5/2008 | Altherr |

(Continued)

OTHER PUBLICATIONS

U.S. Appl. No. 18/084,989, filed Dec. 20, 2022, Jae Young Park.
U.S. Appl. No. 18/101,571, filed Jan. 25, 2023, Jae Young Park.

*Primary Examiner* — Jeremiah C Hallenbeck-Huber
(74) *Attorney, Agent, or Firm* — Fletcher Yoder, P.C.

(57) ABSTRACT

A video encoding system is configured to determine, based on image data, a distortion metric for a prediction mode candidate based on 1) gradient similarity between a prediction block of the image data and a reconstructed prediction block of reconstructed image data generated based on the image data and 2) motion between two frames of the image data. The video encoding system is also configured to select, from a plurality of prediction mode candidates, the prediction mode candidate as a prediction mode based at least in part on the distortion metric. Additionally, the video encoding system is configured to encode the image data based on the prediction mode.

20 Claims, 8 Drawing Sheets

(56) References Cited

U.S. PATENT DOCUMENTS

| | | | |
|---|---|---|---|
| 2011/0090951 A1* | 4/2011 | Ryu | H04N 19/63 |
| | | | 375/E7.126 |
| 2011/0194608 A1 | 8/2011 | Rusert et al. | |
| 2013/0301727 A1 | 11/2013 | Huang et al. | |
| 2014/0126638 A1 | 5/2014 | Sievers | |
| 2014/0301487 A1* | 10/2014 | Laroche | H04N 19/117 |
| | | | 375/240.29 |
| 2015/0249833 A1* | 9/2015 | Tourapis | H04N 19/154 |
| | | | 375/240.03 |
| 2016/0014409 A1* | 1/2016 | Song | H04N 19/117 |
| | | | 375/240.02 |
| 2016/0330439 A1* | 11/2016 | Yu | H04N 19/89 |
| 2017/0094311 A1 | 3/2017 | Chou et al. | |
| 2017/0201747 A1* | 7/2017 | Son | H04N 19/129 |
| 2017/0332099 A1 | 11/2017 | Lee et al. | |
| 2018/0359480 A1* | 12/2018 | Xiu | H04N 19/186 |
| 2019/0026857 A1 | 1/2019 | Brasnett et al. | |
| 2019/0132591 A1* | 5/2019 | Zhang | H04N 19/59 |
| 2019/0215518 A1 | 7/2019 | Alagappan et al. | |
| 2019/0289296 A1* | 9/2019 | Kottke | H04N 19/179 |
| 2020/0021841 A1 | 1/2020 | Leontaris et al. | |
| 2020/0204824 A1* | 6/2020 | Lai | H04N 19/126 |
| 2022/0070441 A1* | 3/2022 | Xiu | H04N 19/103 |
| 2022/0201315 A1* | 6/2022 | Zhang | H04N 19/139 |
| 2023/0179784 A1* | 6/2023 | Li | H04N 19/105 |

* cited by examiner

SUBJECTIVE DISTORTION METRIC FOR RATE DISTORTION DETERMINATIONS

CROSS-REFERENCE TO RELATED APPLICATIONS

This application claims priority to Greek Patent Application No. 20230100789, filed Sep. 29, 2023, entitled "Subjective Distortion Metric for Rate Distortion Determinations," which is hereby incorporated by reference in its entirety for all purposes.

BACKGROUND

The present disclosure generally relates to image processing, and, more particularly, to video encoding.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information, for example, as text, still images, and/or video based on corresponding image data. Since image data may be received from another electronic device and/or stored in the electronic device, the image data may be encoded (e.g., compressed) to reduce size (e.g., number of bits) and, thus, resources (e.g., transmission bandwidth and/or memory addresses) used to transmit and/or store image data. To display image frames, the electronic device may decode encoded image data and instruct the electronic display to adjust luminance of its display pixels based on the decoded image data.

To facilitate encoding, prediction techniques may be used to indicate the image data by referencing other image data. For example, since successively displayed images (e.g., image frames) may be generally similar, inter (e.g., inter-frame) prediction techniques may be used to indicate image data (e.g., a prediction unit) corresponding with a first image frame by referencing image data (e.g., a reference sample) corresponding with a second image frame, which may be displayed before or after the first image frame. To facilitate identifying the reference sample, a motion vector may indicate position of a reference sample in the second image frame relative to position of a prediction unit in the first image frame. In other words, instead of directly compressing the image data, the image data may be encoded based at least in part on a motion vector used to indicate desired value of the image data.

In some instances, motion vectors may be inaccurate or less indicative of a trend (e.g., motion) in image data. For example, when prediction techniques are utilized using only the luma component of image data, motion vectors may be inaccurate, which may thereby cause image data to be encoded in a potentially undesirable manner. As such, to enable enhanced encoding of image data, improved techniques for identifying motion vectors and encoding image data may be desirable. Furthermore, in some cases, encoding techniques may be selected utilizing metrics that do not account for certain correlations between images. To produce higher quality image data, improved techniques may be utilized for evaluating the image data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to processing techniques that may be utilized when performing image processing. For example, the techniques described herein may be utilized as part of a process for encoding source image data. In particular, the techniques described herein relate to scaling source image data prior to performing encoding operations such as determining encoding parameters. For instance, full-resolution image data and low-resolution image data may be derived from source image data. The full-resolution image data may be encoded based on encoding parameters that can be determined based on the low-resolution image data and the full-resolution image data. By utilizing scaled image data, memory bandwidth may be reduced. Additionally, as discussed below, portions of a video encoding system may utilize the low-resolution image data to perform low-resolution motion estimation techniques without downscaling image data (e.g., full-resolution image data). As also discussed below, multiple searches may be performed using downscaled (e.g., low-resolution image data), which may improve the accuracy of the techniques utilized to encode the source image data. Accordingly, the techniques described herein may enable video encoding systems to encode image data more efficiently.

A video encoding system may determine encoding parameters and implement the encoding parameters to encode the full-resolution image data that is generated from source image data. In some embodiments, the full-resolution image data may be encoded using prediction techniques (e.g., inter prediction techniques) by referencing other image data. For example, inter prediction techniques may facilitate encoding the full-resolution image data by referencing image data used to display other image frames.

The video encoding system may determine a reference sample in a second (e.g., reference) image frame for full-resolution image data corresponding with a first image frame using an inter prediction mode. The inter prediction mode may include a motion vector that indicates position (e.g., spatial position) of the reference sample in the second image frame relative to position of the source image data in the first image frame. Additionally, the inter prediction mode may include a reference index that indicates display order (e.g., temporal position) of the second image frame relative to the first image frame.

A motion estimation (ME) block in the video encoding system may determine one or more candidate inter prediction modes. The motion estimation block may perform a motion estimation search to determine reference samples that are similar to the full-resolution image data. Once a reference sample is determined, the motion estimation block may determine a motion vector and reference index to indicate location (e.g., spatial position and temporal position) of the reference sample relative to the full-resolution image data. Generally, performing motion estimation searches may be computationally complex and, thus, time-consuming. However, a duration provided for the motion estimation block to perform its search may be limited, particularly to enable real-time or near real-time transmission or display as refresh rate and/or resolution increases.

Accordingly, the present disclosure provides techniques to improve operational efficiency of the video encoding system. In some embodiments, operational efficiency may be improved by including a low resolution pipeline in parallel with a main encoding pipeline, which determines encoding parameters used to encode the full-resolution image data. Additionally, in some embodiments, the low resolution pipeline and the main encoding pipeline may both be provided access via direct memory access (DMA) to the full-resolution image data and low-resolution image data (derived from the source image data and) stored in memory.

Thus, in such embodiments, the low resolution pipeline and the main encoding pipeline may operate using relatively independent operational timing, which may enable the low resolution pipeline to operate one or more image frames ahead of the main encoding pipeline. In this manner, the low resolution pipeline may determine information ahead of time for use in the main encoding pipeline. By running the low resolution pipeline at least one image frame ahead of the main encoding pipeline, information (e.g., statistics and/or low resolution inter prediction modes) determined by the low resolution pipeline may be used by the main encoding pipeline, for example, to determine motion-weight (e.g., lambda) tuning information used in rate-distortion calculations, frame-rate conversion, image stabilization, and/or the like.

For example, the low resolution pipeline may include a low resolution motion estimation (LRME) block that processes the low-resolution image data to determine low resolution inter prediction modes. The low resolution motion estimation block may perform a motion estimation search on the low-resolution image data, which may be derived from full-resolution samples of image data used as references in the motion estimation search, to determine a downscaled reference sample that is similar to the downscaled source image data. To indicate location of the downscaled reference sample, the low resolution motion estimation block may determine a low resolution inter prediction mode, which includes a motion vector and a reference index.

Since downscaled image data (the low-resolution image data) should be similar to the full-resolution image data, low resolution inter prediction modes may provide an indication where reference samples in full resolution are expected to be located. Accordingly, the motion estimation block in the main encoding pipeline may be initialized with the low resolution inter prediction modes as candidates. In this manner, the low resolution motion estimation block may facilitate reducing amount of image data searched by the motion estimation block and, thus, improving operational efficiency of the video encoding system. To improve processing efficiency, the low resolution motion estimation block may prune the low resolution inter prediction modes before they are evaluated as candidate inter prediction modes by the main encoding pipeline, for example, to consolidate similar low resolution inter prediction modes and, thus, to enable the number of candidate inter prediction modes evaluated by the main encoding pipeline to be reduced.

Additionally, when the low resolution motion estimation block is operating one or more image frame ahead of the main encoding pipeline, the low resolution motion estimation block may determine statistics based at least in part on luma of the source image data. In some embodiments, the statistics may be indicative of global motion across multiple image frames and, thus, used for image stabilization. For example, the low resolution motion estimation block may determine a histogram statistic used to determine a best motion vector and, thus, a global motion vector determined based at least in part on the best motion vector. Based on the global motion statistics, the motion estimation block, which may be implemented in the main encoding pipeline, may determine a global motion vector indicative of motion across multiple image frames. Additionally, based on the global motion vector, the motion estimation block may adjust the candidate inter prediction modes considered, for example, by adjusting (e.g., offsetting) their motion vectors based at least in part on the global motion vector. Furthermore, a search area in image data may be adjusted based on the global motion vector.

BRIEF DESCRIPTION OF THE DRAWINGS

Various aspects of this disclosure may be better understood upon reading the following detailed description and upon reference to the drawings in which.

DETAILED DESCRIPTION

Figure 1:
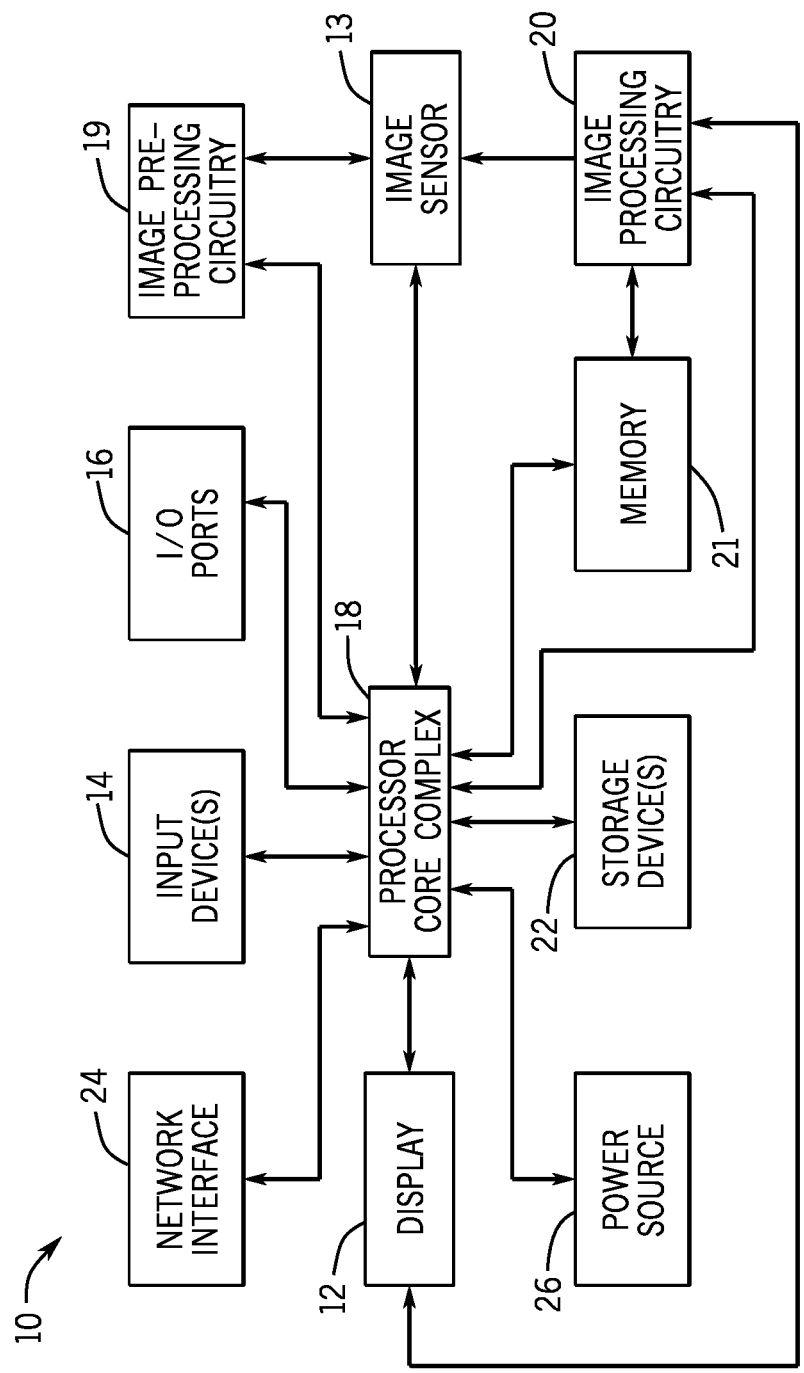
FIG. 1 is a block diagram of an electronic device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

An electronic device may facilitate visually presenting information by instructing an electronic display to display one or more images (e.g., image frames) based on corresponding image data. In some embodiments, the image data may be generated by an image sensor (e.g., digital camera) and stored in the electronic device. Additionally, when the image data is generated external from the electronic display, the image data may be transmitted to the electronic device. To reduce resource usage, image data may be encoded (e.g., compressed) to reduce size (e.g., number of bits) which, for example, may reduce transmission bandwidth and/or memory address usage.

A video encoding system may determine encoding parameters and implement the encoding parameters to encode source image data. To facilitate encoding, source image data for an image may be divided into one or more coding units. As used herein, a "coding unit" is intended to describe a sample of source image data (e.g., pixel image data) corresponding to a group of display pixels, which is encoded using the same prediction technique. However, it should be noted that "coding unit" may also refer to a sample of image data that is generated from source image data. For instance, as described herein, source image data may be scaled to generate different sets of image data (e.g., scaled image data). The sets of scaled image data, as discussed below, may include full-resolution image data and low-resolution image data. In such a case, a "coding unit" may be a sample of the full-resolution image data generated from source image data.

Accordingly, the video encoding system may determine a prediction technique (e.g., intra prediction technique or inter prediction technique) to be implemented to predict a coding unit, for example, as one or more prediction samples. Prediction techniques may facilitate encoding by enabling the source image data to be indicated via reference to other image data. For example, since an image frame may change gradually, the video encoding system may utilize intra prediction techniques to produce a prediction sample based on image data used to display the same image. Additionally, since successively displayed images may change gradually, the video encoding system may utilize inter prediction techniques to produce a prediction sample based on image data used to display other images.

Although conceptually similar, each prediction technique may include one or more prediction modes that utilize different encoding schemes. In other words, implementing different prediction modes may result in different prediction samples. For example, utilizing a first intra prediction mode (e.g., vertical prediction mode), the video encoding system may produce a prediction sample with each column set equal to image data for a pixel directly above the column. On the other hand, utilizing a second intra prediction mode (e.g., DC prediction mode), the video encoding system may produce a prediction sample set equal to an average of adjacent pixel image data. Additionally, utilizing a first inter prediction mode (e.g., first reference index and first motion vector), the video encoding system may produce a prediction sample based on a reference sample at a first position within a first image frame. Utilizing a second inter prediction mode (e.g., second reference index and second motion vector), however, the video encoding system may produce a prediction sample based on a reference sample at a second position within a second image frame.

Although using the same prediction technique, a coding unit may be predicted using one or more different prediction modes. As using herein, a "prediction unit" is intended to describe a sample within a coding unit that utilizes the same prediction mode. In some embodiments, a coding unit may include a single prediction unit. In other embodiments, the coding unit may be divided into multiple prediction units, which each uses a different prediction mode.

Accordingly, the video encoding system may evaluate candidate prediction modes (e.g., candidate inter prediction modes, candidate intra prediction modes, and/or a skip mode) to determine what prediction mode to use for each prediction unit in a coding unit. To facilitate, a motion estimation (ME) block in the video encoding system may determine one or more candidate inter prediction modes. In some embodiments, an inter prediction mode may include a reference index (e.g., temporal position), which indicates in which image a reference sample is located, and a motion vector (e.g., spatial position), which indicates the position of the reference sample relative to a prediction unit.

To determine a candidate, inter prediction mode, the motion estimation block may search image data (e.g., reconstructed samples) used to display other image frames for reference samples that are similar to a prediction unit. Once a reference sample is determined, the motion estimation block may determine a motion vector and reference index to indicate location of the reference sample.

Generally, the quality of the match between prediction unit and reference sample may be dependent on search area (e.g., amount of image data). For example, increasing search area may improve likelihood of finding a closer match with the prediction unit. However, increasing search area may also increase computation complexity as well as increase memory bandwidth utilized to perform searches, which may cause increases in searching duration. In some embodiments, duration provided for the motion estimation block to perform its search may be limited, for example, to enable real-time or near real-time transmission and/or display.

Accordingly, as will be described in more detail below, the present disclosure provides techniques to improve operational efficiency of a video encoding system, for example, by enabling search area and/or candidate prediction modes evaluated by a main encoding pipeline to be adaptively (e.g., dynamically) adjusted based at least in part on processing performed by a low resolution pipeline. In some embodiments, operational efficiency may be improved by including a low resolution pipeline in parallel with the main encoding pipeline. Additionally, in some embodiments, the low resolution pipeline and the main encoding pipeline may both be provided access via direct memory access (DMA) to source image data stored in memory.

Thus, the low resolution pipeline and the main encoding pipeline may operate using relatively independent operational timing. In fact, the low resolution pipeline may operate one or more image frames ahead of the main encoding pipeline. In this manner, the low resolution pipeline may process image data ahead of time to determine information (e.g., low resolution inter prediction modes, luma histogram statistics, and/or sum of absolute difference statistics) to be used in the main encoding pipeline.

To facilitate determining the relevant information, the low resolution pipeline may include a low resolution motion estimation (LRME) block. In some embodiments, the low resolution motion estimation block may downscale source image data (e.g., a coding unit). For example, a low resolution motion estimation block may downscale a 32×32 coding unit to one-sixteenth resolution to generate an 8×8 downscaled coding unit. As also discussed herein, the low resolution motion estimation block may receive (e.g., via DMA access) scaled image data (e.g., downscaled image data) that is generated from source image data by other circuitry (e.g., image pre-processing circuitry) and stored in memory. In some cases, the resolution of the scaled image data may correspond to one-sixteenth of a resolution of other image data generated from source image data. For example, as discussed below, the image pre-processing circuitry may generate full-resolution image data and low-resolution image data from source image data. The low-resolution image data may have a resolution that is one-sixteenth of a resolution of the full-resolution image data. Accordingly, the low resolution motion estimation block may generate a downscaled coding unit without downscaling source image data. Rather, the low resolution motion estimation block may generate the downscaled coding unit using low-resolution image data generated by image pre-processing circuitry (e.g., by utilizing a portion of the downscaled source image data). By doing so, more resources (e.g., processing resources) of the low resolution motion estimation block may be utilized to perform motion estimation techniques. Furthermore, by generating full-resolution image data and low-resolution image data from source image data prior to performing motion estimation techniques and reading the low resolution image data (e.g., instead of the full-resolution image data) when performing low-resolution motion estimation techniques, the amount of memory bandwidth utilized to read image data may be reduced.

The low resolution motion estimation block may then search previously downscaled source image data to find (e.g., identify) a downscaled reference sample that is similar to a downscaled prediction unit within the downscaled coding unit. To indicate location of the downscaled reference sample, the low resolution motion estimation block may determine a low resolution inter prediction mode, which includes a motion vector and a reference index. More specifically, the motion vector may indicate spatial position of a reference sample in full resolution corresponding with the downscaled reference sample relative to a prediction unit in full resolution corresponding with the downscaled prediction unit. Additionally, the reference index may indicate display order (e.g., temporal position) of a reference image frame corresponding with the downscaled reference sample relative to an image frame corresponding with the downscaled prediction unit.

The low resolution motion estimation block may then enable the low resolution inter prediction mode to be accessed and used by the main encoding pipeline. In some embodiments, the low resolution motion estimation block may store the low resolution inter prediction mode in memory using direct memory access and the main encoding pipeline may retrieve the low resolution inter prediction mode using direct memory access. Additionally, the low resolution motion estimation block may store the downscaled source image data in memory for use in subsequent low resolution motion estimation searches.

In some embodiments, the motion estimation block in the main encoding pipeline may retrieve candidate inter prediction modes from memory. For each candidate inter prediction mode, the motion estimation block may perform a motion estimation search within a range of pixels (e.g., +/−3 pixel area) and/or sub-pixels (e.g., +/−0.5 pixel area) around its indicated reference sample in full resolution. Since downscaled image data should be similar to full resolution image data, low resolution inter prediction modes may provide an indication where closely matching reference samples are expected to be located. As such, the motion estimation block may utilize the low resolution inter prediction modes as candidates. In some embodiments, multiple passes of motion estimation searches (e.g., in the form of a recursive search) may be performed. In this manner, the low resolution motion estimation block may facilitate reducing amount of image data searched by the motion estimation block and, thus, searching duration, which may facilitate real-time or near real-time transmission and/or display of image data.

Additionally, when operating one or more image frames ahead of the main encoding pipeline, the low resolution motion estimation block may determine statistics used to improve operational efficiency of the main encoding pipeline. For example, the low resolution motion estimation block may determine luma histogram statistics that indicate number of pixels in downscaled image data at each luma value. Additionally or alternatively, the low resolution motion estimation block may determine a zero vector sum of absolute difference (SAD) statistics, which may indicate difference between a downscaled prediction unit and a downscaled reference sample indicated by a zero vector. In some embodiments, the statistics may be used to detect when a scene change is expected to occur.

As described above, inter prediction techniques are premised on successively displayed image frames being similar. Thus, effectiveness of inter prediction techniques across a scene change may be greatly reduced. As such, the main encoding pipeline may select a prediction mode from one or more candidate intra prediction modes and/or a skip mode. Thus, in some embodiments, the motion estimation block may be disabled, which may facilitate further reducing computational complexity, improving operational efficiency, and/or reducing power consumption of the main encoding pipeline and, thus, an electrical device in which it is implemented.

To help illustrate, an electronic device 10 (e.g., computing device) that may utilize an electronic display 12 to display image frames based on image data and/or an image sensor 13 to capture image data is described in FIG. 1. As will be described in more detail below, the electronic device 10 may be any suitable computing device, such as a handheld computing device, a tablet computing device, a notebook computer, and/or the like. Thus, it should be noted that FIG. 1 is merely one example of a particular implementation and is intended to illustrate the types of components that may be present in the electronic device 10.

The electronic device 10 includes the electronic display 12, an image sensor 13, one or more input structures 14 (e.g., input devices), one or more input/output (I/O) ports 16, a processor core complex 18 having one or more processor(s) or processor cores, image pre-processing circuitry 19, image processing circuitry 20, local memory 21, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 21 and the main memory storage device 22 may be included in a single component.

The processor core complex 18, image pre-processing circuitry 19, and image processing circuitry 20 may execute instructions stored in local memory 21 and/or the main memory storage device 22 to perform certain image processing operations. For example, the processor core complex 18 and/or image processing circuitry 20 may encode image data captured by the image sensor 13 and/or decode image data for display on the electronic display 12. Additionally, the image pre-processing circuitry 19 and image processing circuitry 20 may scale source image data (e.g., image data captured by the image sensor 13) to generate scaled image data that may be used to perform encoding operations. As such, the processor core complex 18, image pre-processing circuitry 19, and image processing circuitry 20 may include one or more general purpose microprocessors, one or more application specific processors (ASICs), one or more field programmable logic arrays (FPGAs), or any combination thereof. Additionally, in some embodiments, the image pre-processing circuitry 19, image processing circuitry 20, or both the image pre-processing circuitry 19 and the image processing circuitry 20 may be included in the processor core complex 18.

The local memory 21 and/or the main memory storage device 22 may be tangible, non-transitory, computer-readable mediums that store instructions executable by and data to be processed by the processor core complex 18 and the image pre-processing circuitry 19. For example, the local memory 21 may include random access memory (RAM) and the main memory storage device 22 may include read only memory (ROM), rewritable non-volatile memory such as flash memory, hard drives, optical discs, and the like. By way of example, a computer program product containing the instructions may include an operating system or an application program.

Using the network interface 24, the electronic device 10 may communicatively couple to a network and/or other computing devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit encoded image data to a network and/or receive encoded image data from the network for display on the electronic display 12.

The processor core complex 18 is operably coupled with I/O ports 16, which may enable the electronic device 10 to interface with various other electronic devices. For example, a portable storage device may be connected to an I/O port 16, thereby enabling the processor core complex 18 to communicate data with a portable storage device. In this manner, the I/O ports 16 may enable the electronic device 10 to output encoded image data to the portable storage device and/or receive encoded image data from the portable storage device.

The power source 26 may include any suitable source of energy, such as a rechargeable lithium polymer (Li-poly) battery and/or an alternating current (AC) power converter. Furthermore, as depicted, the processor core complex 18 is operably coupled with input structures 14, which may enable a user to interact with the electronic device 10. The input structures 14 may include buttons, keyboards, mice, trackpads, and/or the like. Additionally or alternatively, the electronic display 12 may include touch components that enable user inputs to the electronic device 10 by detecting occurrence and/or position of an object touching its screen (e.g., surface of the electronic display 12).

In addition to enabling user inputs, the electronic display 12 may present visual representations of information by display images (e.g., image frames), such as a graphical user interface (GUI) of an operating system, an application interface, a still image, or video content. As described above, the electronic display 12 may display an image based on corresponding image data. In some embodiments, the image data may be received from other electronic devices 10, for example, via the network interface 24 and/or the I/O ports 16. Additionally or alternatively, the image data may be generated by electronic device 10 using the image sensor 13. In some embodiments, image sensor 13 may digitally capture visual representations of proximate physical features as image data.

As described above, the image data may be encoded (e.g., compressed), for example, by the electronic device 10 that generated the image data, to reduce number of memory addresses used to store and/or bandwidth used to transmit the image data. Once generated or received, the encoded image data may be stored in local memory 21. Accordingly, to a display image corresponding with encoded image data, the processor core complex 18 or other image data processing circuitry may retrieve encoded image data from local memory 21, decode the encoded image data, and instruct the electronic display 12 to display image frames based on the decoded image data.

Figure 2:
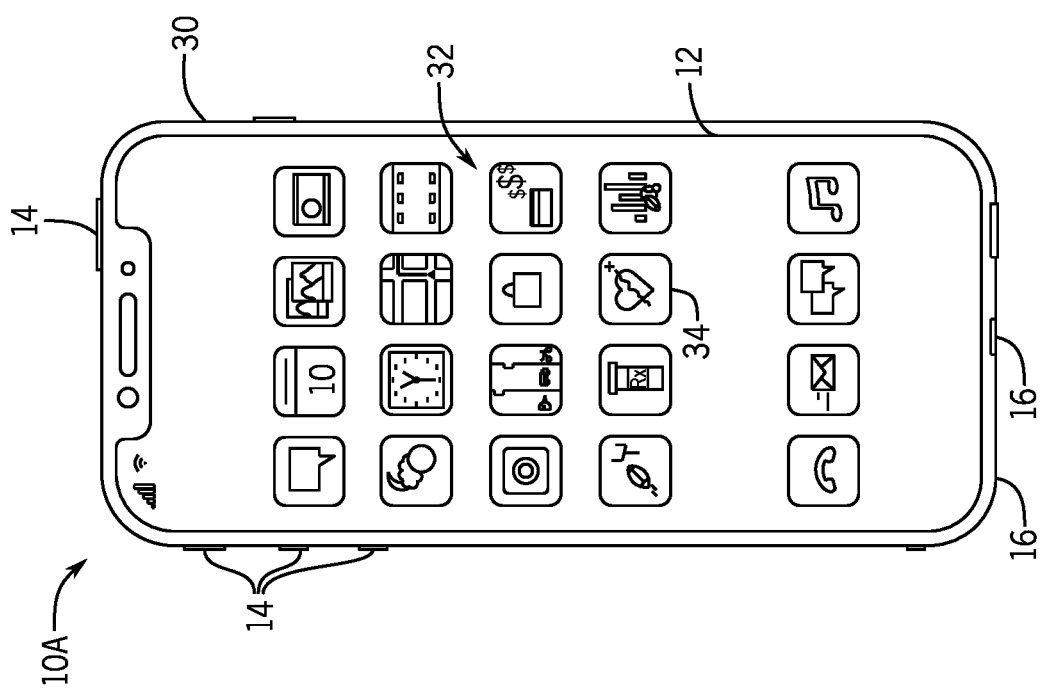
FIG. 2 is an example of the electronic device of FIG. 1, in accordance with an embodiment.

The electronic device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc.

The handheld device 10A includes an enclosure 30 (e.g., housing). The enclosure 30 may protect interior components from physical damage and/or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 may be accessed through openings in the enclosure 30 and may include, for example, an audio jack to connect to external devices.

Figure 3:
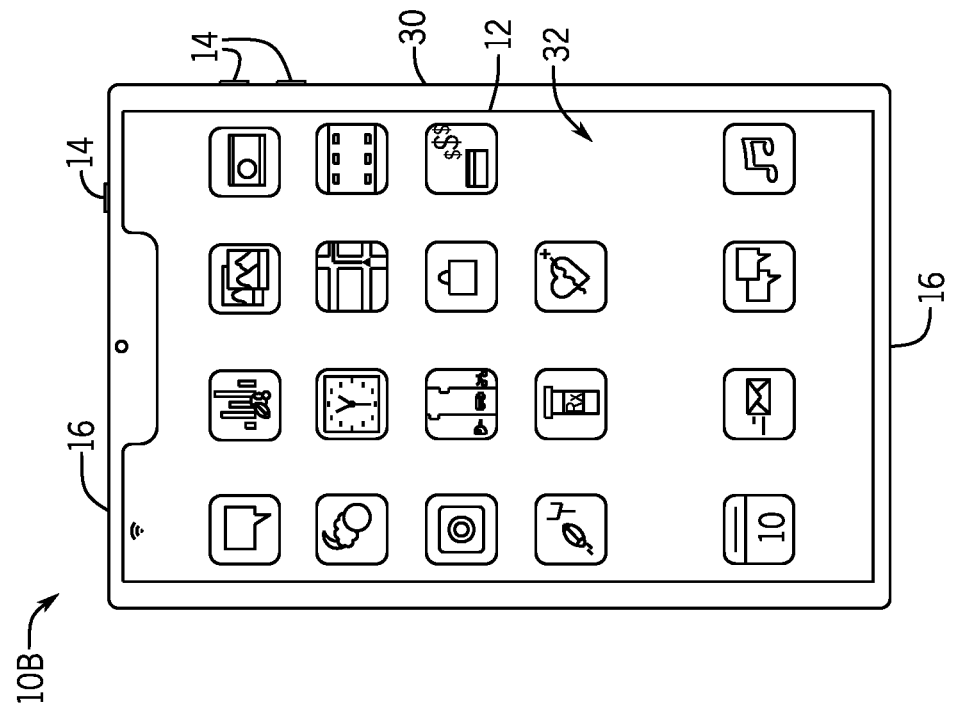
FIG. 3 is another example of the electronic device of FIG. 1, in accordance with an embodiment.
Figure 4:
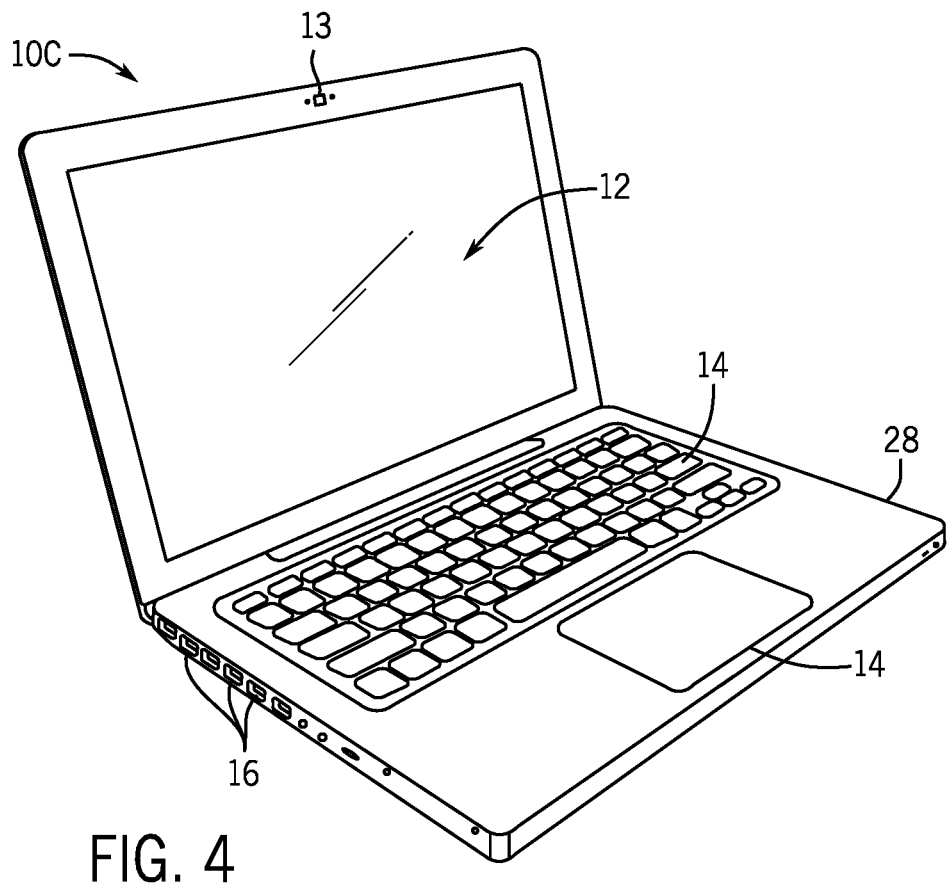
FIG. 4 is another example of the electronic device of FIG. 1, in accordance with an embodiment.
Figure 5:
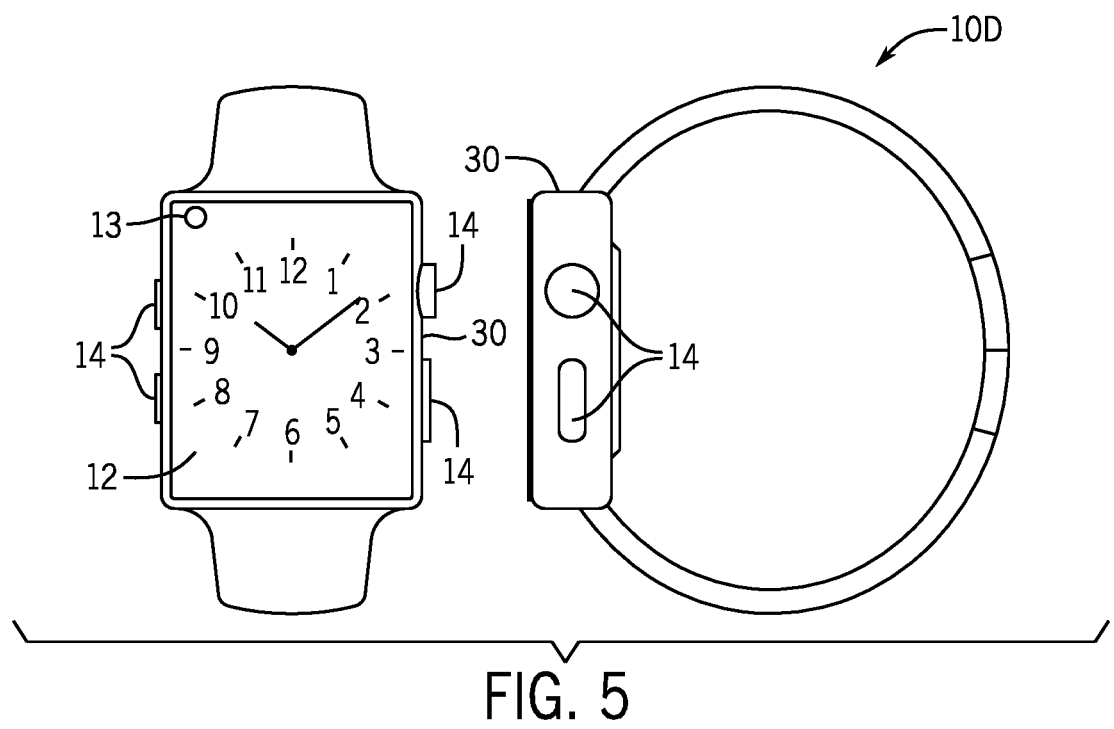
FIG. 5 is another example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
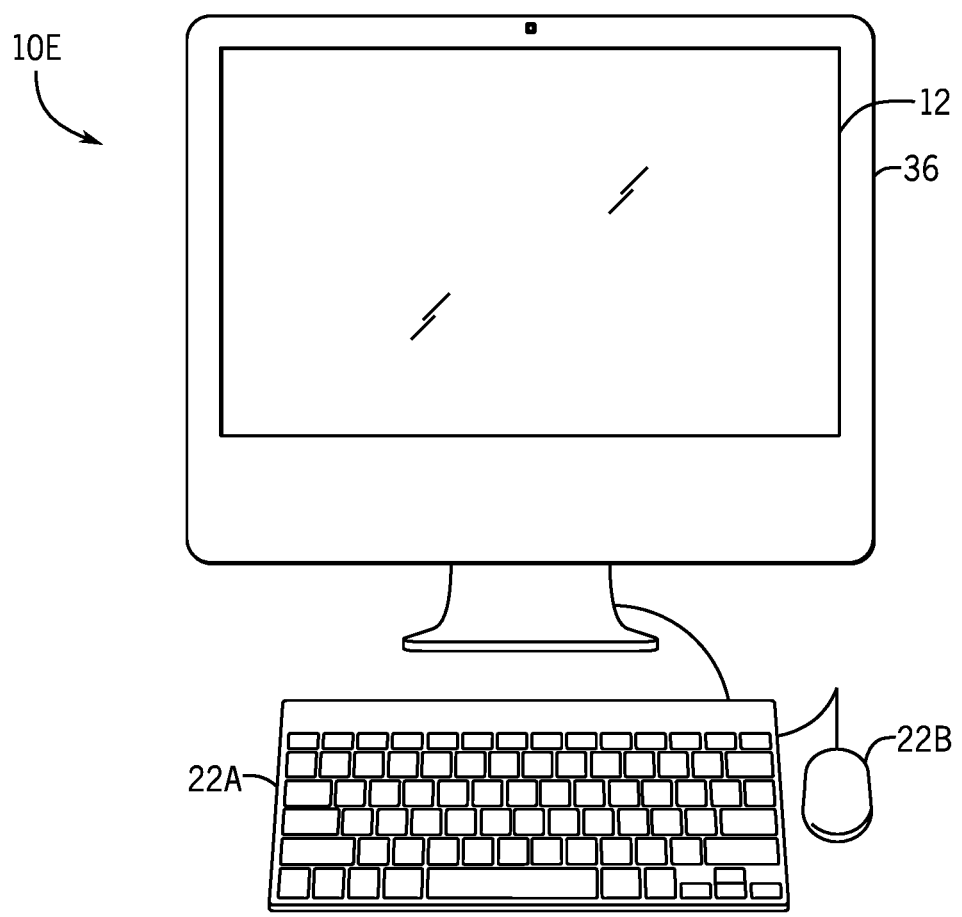
FIG. 6 is another example of the electronic device of FIG. 1, in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input devices 14, such as the keyboard 14A or mouse 14B (e.g., input devices 14), which may connect to the computer 10E.

As described above, source image data may be encoded (e.g., compressed) to reduce resource usage. Additionally, in some embodiments, the duration between generation of image data and display of a corresponding image based on the image data may be limited to enable real-time or near real-time display and/or transmission. For example, image data captured by the image sensor 13 may be displayed on the electronic display 12 with minimal delay to enable a user to determine physical features proximate the image sensor 13 in real-time or near real-time. Additionally, image data generated by the electronic device 10 (e.g., by the image sensor 13) may be transmitted (e.g., broadcast) to one or more other electronic devices 10 to enable a real-time or near real-time streaming. To enable real-time or near real-time transmission and/or display, duration available to encode image data may be limited-particularly as the resolution of images and/or refresh rates of electronic displays 12 increase.

Figure 7:
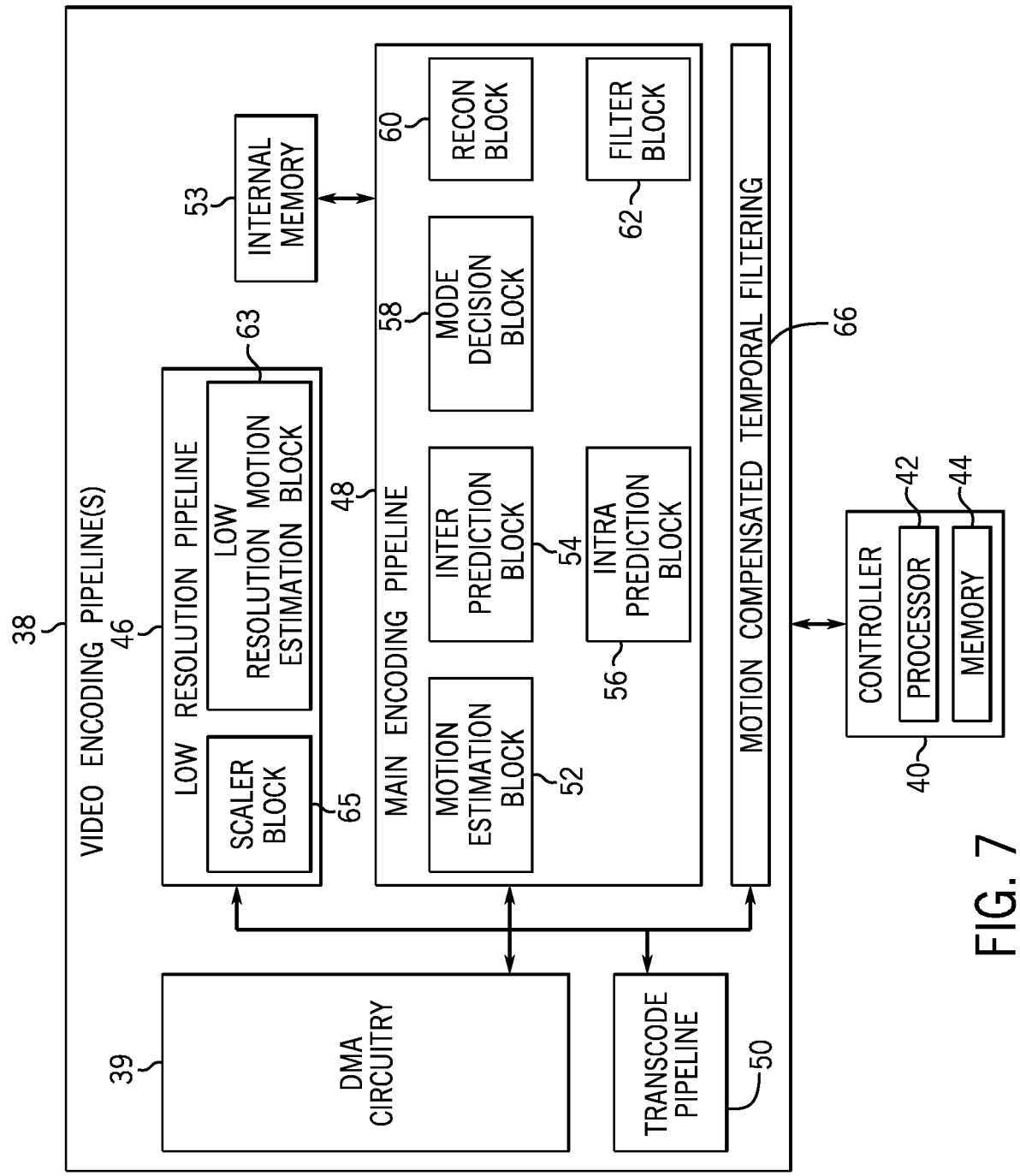
FIG. 7 is a block diagram of a portion of the electronic device of FIG. 1 including a video encoding system, in accordance with an embodiment.

An example of a portion of an electronic device 10, which includes a video encoding system 38, is shown in FIG. 7. The video encoding system 38 may be implemented via circuitry, for example, packaged as a system-on-chip (SoC). Additionally or alternatively, the video encoding system 38 may be included in the processor core complex 18, the image processing circuitry 20, a timing controller (TCON) in the electronic display 12, one or more other processing units, other processing circuitry, or any combination thereof.

The video encoding system 38 may be communicatively coupled to a controller 40. The controller 40 may generally control operation of the video encoding system 38. Although depicted as a single controller 40, in other embodiments, one or more separate controllers 40 may be used to control operation of the video encoding system 38. Additionally, in some embodiments, the controller 40 may be implemented in the video encoding system 38, for example, as a dedicated video encoding controller.

The controller 40 may include a controller processor 42 and controller memory 44. In some embodiments, the controller processor 42 may execute instructions and/or process data stored in the controller memory 44 to control operation of the video encoding system 38. In other embodiments, the controller processor 42 may be hardwired with instructions that control operation of the video encoding system 38. Additionally, in some embodiments, the controller processor 42 may be included in the processor core complex 18, the image processing circuitry 20, and/or separate processing circuitry (e.g., in the electronic display 12), and the controller memory 44 may be included in local memory 21, main memory storage device 22, and/or a separate, tangible, non-transitory computer-readable medium (e.g., in the electronic display 12).

The video encoding system 38 includes direct memory access (DMA) circuitry 39. In some embodiments, the DMA circuitry 39 may communicatively couple the video encoding system 38 to an image sensor, such as external memory that stores source image data, for example, generated by the image sensor 13 or received via the network interface 24 or the I/O ports 16.

To facilitate generating encoded image data, the video encoding system 38 may include multiple parallel pipelines. For example, in the depicted embodiment, the video encoding system 38 includes a low-resolution pipeline 46, a main encoding pipeline 48, and a transcode pipeline 50. The main encoding pipeline 48 may encode source image data using prediction techniques (e.g., inter prediction techniques or intra prediction techniques), and the transcode pipeline 50 may subsequently entropy encode syntax elements that indicate encoding parameters (e.g., quantization coefficient, inter prediction mode, and/or intra prediction mode) used to prediction encode the image data.

To facilitate prediction encoding source image data, the main encoding pipeline 48 may perform various functions. To simplify discussion, the functions are divided between various blocks (e.g., circuitry or modules) in the main encoding pipeline 48. In the depicted embodiment, the main encoding pipeline 48 includes a motion estimation block 52, an inter prediction block 54, an intra prediction block 56, a mode decision block 58, a reconstruction block 60, and a filter block 62.

The motion estimation block 52 is communicatively coupled to the DMA circuitry 39. In this manner, the motion estimation block 52 may receive source image data via the DMA circuitry 39, which may include a luma component (e.g., Y) and two chroma components (e.g., Cr and Cb). In some embodiments, the motion estimation block 52 may process one coding unit, including one luma coding block and two chroma coding blocks, at a time. As used herein a "luma coding block" is intended to describe the luma component of a coding unit and a "chroma coding block" is intended to describe a chroma component of a coding unit.

A luma coding block may be the same resolution as the coding unit. On the other hand, the chroma coding blocks may vary in resolution based on chroma sampling format. For example, using a 4:4:4 sampling format, the chroma coding blocks may be the same resolution as the coding unit. However, the chroma coding blocks may be half (e.g., half resolution in the horizontal direction) the resolution of the coding unit when a 4:2:2 sampling format is used and a quarter (e.g., half resolution in the horizontal direction and half resolution in the vertical direction) the resolution of the coding unit when a 4:2:0 sampling format is used.

As described above, a coding unit may include one or more prediction units, which may each be encoded using the same prediction technique, but different prediction modes. Each prediction unit may include one luma prediction block and two chroma prediction blocks. As used herein a "luma prediction block" is intended to describe the luma component of a prediction unit and a "chroma prediction block" is intended to describe a chroma component of the prediction unit. In some embodiments, the luma prediction block may be the same resolution as the prediction unit. On the other hand, similar to the chroma coding blocks, the chroma prediction blocks may vary in resolution based on chroma sampling format.

Based at least in part on the one or more luma prediction blocks, the motion estimation block 52 may determine candidate inter prediction modes that can be used to encode a prediction unit. An inter prediction mode may include a motion vector and a reference index to indicate location (e.g., spatial position and temporal position) of a reference sample relative to a prediction unit. More specifically, the reference index may indicate display order of a reference image frame corresponding with the reference sample relative to a current image frame corresponding with the prediction unit. Additionally, the motion vector may indicate position of the reference sample in the reference image frame relative to position of the prediction unit in the current image frame.

To determine a candidate inter prediction mode, the motion estimation block 52 may search reconstructed luma image data, which may be previously generated by the reconstruction block 60 and stored in internal memory 53 (e.g., reference memory) of the video encoding system 38. For example, the motion estimation block 52 may determine a reference sample for a prediction unit by comparing its luma prediction block to the luma of reconstructed image data. In some embodiments, the motion estimation block 52 may determine how closely a prediction unit and a reference sample match based on a match metric. In some embodiments, the match metric may be the sum of absolute difference (SAD) between a luma prediction block of the prediction unit and luma of the reference sample. Additionally or alternatively, the match metric may be the sum of absolute transformed difference (SATD) between the luma prediction block and luma of the reference sample. When the match metric is above a match threshold, the motion estimation block 52 may determine that the reference sample and the prediction unit do not closely match. On the other hand, when the match metric is below the match threshold, the motion estimation block 52 may determine that the reference sample and the prediction unit are similar.

After a reference sample that sufficiently matches the prediction unit is determined, the motion estimation block 52 may determine location of the reference sample relative to the prediction unit. For example, the motion estimation block 52 may determine a reference index to indicate a reference image frame, which contains the reference sample, relative to a current image frame, which contains the prediction unit. Additionally, the motion estimation block 52 may determine a motion vector to indicate position of the reference sample in the reference frame relative to position of the prediction unit in the current frame. In some embodiments, the motion vector may be expressed as (mvX, mvY), where mvX is horizontal offset and mvY is a vertical offset between the prediction unit and the reference sample. The values of the horizontal and vertical offsets may also be referred to as x-components and y-components, respectively.

In this manner, the motion estimation block 52 may determine candidate inter prediction modes (e.g., reference index and motion vector) for one or more prediction units in the coding unit. The motion estimation block 52 may then input candidate inter prediction modes to the inter prediction block 54. Based at least in part on the candidate inter prediction modes, the inter prediction block 54 may determine luma prediction samples (e.g., predictions of a prediction unit).

The inter prediction block 54 may determine a luma prediction sample by applying motion compensation to a reference sample indicated by a candidate inter prediction mode. For example, the inter prediction block 54 may apply motion compensation by determining luma of the reference sample at fractional (e.g., quarter or half) pixel positions. The inter prediction block 54 may then input the luma prediction sample and corresponding candidate inter prediction mode to the mode decision block 58 for consideration. In some embodiments, the inter prediction block 54 may sort the candidate inter prediction modes based on associated mode cost and input only a specific number to the mode decision block 58.

The mode decision block 58 may also consider one or more candidate intra predictions modes and corresponding luma prediction samples output by the intra prediction block 56. The main encoding pipeline 48 may be capable of implementing multiple (e.g., 13, 17, 25, 29, 35, 38, or 43) different intra prediction modes to generate luma prediction samples based on adjacent pixel image data. Thus, in some embodiments, the intra prediction block 56 may determine a candidate intra prediction mode and corresponding luma prediction sample for a prediction unit based at least in part on luma of reconstructed image data for adjacent (e.g., top, top right, left, or bottom left) pixels, which may be generated by the reconstruction block 60.

For example, utilizing a vertical prediction mode, the intra prediction block 56 may set each column of a luma prediction sample equal to reconstructed luma of a pixel directly above the column. Additionally, utilizing a DC prediction mode, the intra prediction block 56 may set a luma prediction sample equal to an average of reconstructed luma of pixels adjacent the prediction sample. The intra prediction block 56 may then input candidate intra prediction modes and corresponding luma prediction samples to the mode decision block 58 for consideration. In some embodiments, the intra prediction block 56 may sort the candidate intra prediction modes based on associated mode cost and input only a specific number to the mode decision block 58.

The mode decision block 58 may determine encoding parameters to be used to encode the source image data (e.g., a coding unit). In some embodiments, the encoding parameters for a coding unit may include prediction technique (e.g., intra prediction techniques or inter prediction techniques) for the coding unit, number of prediction units in the coding unit, size of the prediction units, prediction mode (e.g., intra prediction modes or inter prediction modes) for each of the prediction units, number of transform units in the coding unit, size of the transform units, whether to split the coding unit into smaller coding units, or any combination thereof.

To facilitate determining the encoding parameters, the mode decision block 58 may determine whether the image frame is an I-frame, a P-frame, or a B-frame. In I-frames, source image data is encoded only by referencing other image data used to display the same image frame. Accordingly, when the image frame is an I-frame, the mode decision block 58 may determine that each coding unit in the image frame may be prediction encoded using intra prediction techniques.

On the other hand, in a P-frame or B-frame, source image data may be encoded by referencing image data used to display the same image frame and/or a different image frames. More specifically, in a P-frame, source image data may be encoding by referencing image data associated with a previously coded or transmitted image frame. Additionally, in a B-frame, source image data may be encoded by referencing image data used to code two previous image frames. More specifically, with a B-frame, a prediction sample may be generated based on prediction samples from two previously coded frames; the two frames may be different from one another or the same as one another. Accordingly, when the image frame is a P-frame or a B-frame, the mode decision block 58 may determine that each coding unit in the image frame may be prediction encoded using either intra techniques or inter techniques.

Although using the same prediction technique, the configuration of luma prediction blocks in a coding unit may vary. For example, the coding unit may include a variable number of luma prediction blocks at variable locations within the coding unit, which each uses a different prediction mode. As used herein, a "prediction mode configuration" is intended to describe the number, size, location, and prediction mode of luma prediction blocks in a coding unit. Thus, the mode decision block 58 may determine a candidate inter prediction mode configuration using one or more of the candidate inter prediction modes received from the inter prediction block 54. Additionally, the mode decision block 58 may determine a candidate intra prediction mode configuration using one or more of the candidate intra prediction modes received from the intra prediction block 56.

Since a coding unit may utilize the same prediction technique, the mode decision block 58 may determine prediction technique for the coding unit by comparing rate-distortion metrics (e.g., costs) associated with the candidate prediction mode configurations and/or a skip mode. In some embodiments, the rate-distortion metric may be determined by summing a first product obtained by multiplying an estimated rate that indicates number of bits expected to be used to indicate encoding parameters and a first weighting factor for the estimated rate and a second product obtained by multiplying a distortion metric (e.g., sum of squared difference) resulting from the encoding parameters and a second weighting factor for the distortion metric. The first weighting factor may be a Lagrangian multiplier, and the first weighting factor may depend on a quantization parameter associated with image data being processed.

The distortion metric may indicate amount of distortion in decoded image data expected to be caused by implementing a prediction mode configuration. Accordingly, in some embodiments, the distortion metric may be a sum of squared difference (SSD) between a luma coding block (e.g., source image data) and reconstructed luma image data received from the reconstruction block 60. Additionally or alternatively, the distortion metric may be a sum of absolute transformed difference (SATD) between the luma coding block and reconstructed luma image data received from the reconstruction block 60.

In some embodiments, prediction residuals (e.g., differences between source image data and prediction sample) resulting in a coding unit may be transformed as one or more transform units. As used herein, a "transform unit" is intended to describe a sample within a coding unit that is transformed together. In some embodiments, a coding unit may include a single transform unit. In other embodiments, the coding unit may be divided into multiple transform units, which is each separately transformed.

Additionally, the estimated rate for an intra prediction mode configuration may include expected number of bits used to indicate intra prediction technique (e.g., coding unit overhead), expected number of bits used to indicate intra prediction mode, expected number of bits used to indicate a prediction residual (e.g., source image data-prediction sample), and expected number of bits used to indicate a transform unit split. On the other hand, the estimated rate for an inter prediction mode configuration may include expected number of bits used to indicate inter prediction technique, expected number of bits used to indicate a motion vector (e.g., motion vector difference), and expected number of bits used to indicate a transform unit split. Additionally, the estimated rate of the skip mode may include number of bits expected to be used to indicate the coding unit when prediction encoding is skipped.

The mode decision block 58 may select a prediction mode configuration or skip mode with the lowest associated rate-distortion metric for a coding unit. In this manner, the mode decision block 58 may determine encoding parameters for a coding unit, which may include prediction technique (e.g., intra prediction techniques or inter prediction techniques) for the coding unit, number of prediction units in the coding unit, size of the prediction units, prediction mode (e.g., intra prediction modes or inter prediction modes) for each of the prediction unit, number of transform units in the coding block, size of the transform units, whether to split the coding unit into smaller coding units, or any combination thereof.

To facilitate improving perceived image quality resulting from decoded image data, the main encoding pipeline 48 may then mirror decoding of encoded image data. To facilitate, the mode decision block 58 may output the encoding parameters and/or luma prediction samples to the reconstruction block 60. Based on the encoding parameters and reconstructed image data associated with one or more adjacent blocks of image data, the reconstruction block 60 may reconstruct image data.

More specifically, the reconstruction block 60 may generate the luma component of reconstructed image data. In some embodiments, the reconstruction block 60 may generate reconstructed luma image data by subtracting the luma prediction sample from luma of the source image data to determine a luma prediction residual. The reconstruction block 60 may then divide the luma prediction residuals into luma transform blocks as determined by the mode decision block 58, perform a forward transform and quantization on each of the luma transform blocks, and perform an inverse transform and quantization on each of the luma transform blocks to determine a reconstructed luma prediction residual. The reconstruction block 60 may then add the reconstructed luma prediction residual to the luma prediction sample to determine reconstructed luma image data. As described above, the reconstructed luma image data may then be fed back for use in other blocks in the main encoding pipeline 48, for example, via storage in internal memory 53 of the main encoding pipeline 48. Additionally, the reconstructed luma image data may be output to the filter block 62.

The reconstruction block 60 may also generate both chroma components of reconstructed image data. In some embodiments, chroma reconstruction may be dependent on sampling format. For example, when luma and chroma are sampled at the same resolution (e.g., 4:4:4 sampling format), the reconstruction block 60 may utilize the same encoding parameters as used to reconstruct luma image data. In such embodiments, for each chroma component, the reconstruction block 60 may generate a chroma prediction sample by applying the prediction mode configuration determined by the mode decision block 58 to adjacent pixel image data.

The reconstruction block 60 may then subtract the chroma prediction sample from chroma of the source image data to determine a chroma prediction residual. Additionally, the reconstruction block 60 may divide the chroma prediction residual into chroma transform blocks as determined by the mode decision block 58, perform a forward transform and quantization on each of the chroma transform blocks, and perform an inverse transform and quantization on each of the chroma transform blocks to determine a reconstructed chroma prediction residual. The chroma reconstruction block may then add the reconstructed chroma prediction residual to the chroma prediction sample to determine reconstructed chroma image data, which may be input to the filter block 62.

However, in other embodiments, chroma sampling resolution may vary from luma sampling resolution, for example when a 4:2:2 or 4:2:0 sampling format is used. In such embodiments, encoding parameters determined by the mode decision block 58 may be scaled. For example, when the 4:2:2 sampling format is used, size of chroma prediction blocks may be scaled in half horizontally from the size of prediction units determined in the mode decision block 58. Additionally, when the 4:2:0 sampling format is used, size of chroma prediction blocks may be scaled in half vertically and horizontally from the size of prediction units determined in the mode decision block 58. In a similar manner, a motion vector determined by the mode decision block 58 may be scaled for use with chroma prediction blocks.

To improve quality of decoded image data, the filter block 62 may filter the reconstructed image data (e.g., reconstructed chroma image data and/or reconstructed luma image data). In some embodiments, the filter block 62 may perform deblocking and/or sample adaptive offset (SAO) functions. For example, the filter block 62 may perform deblocking on the reconstructed image data to reduce perceivability of blocking artifacts that may be introduced. Additionally, the filter block 62 may perform a sample adaptive offset function by adding offsets to portions of the reconstructed image data.

To enable decoding, encoding parameters used to generate encoded image data may be communicated to a decoding device. In some embodiments, the encoding parameters may include the encoding parameters determined by the mode decision block 58 (e.g., prediction unit configuration and/or transform unit configuration), encoding parameters used by the reconstruction block 60 (e.g., quantization coefficients), and encoding parameters used by the filter block 62. To facilitate communication, the encoding parameters may be expressed as syntax elements. For example, a first syntax element may indicate a prediction mode (e.g., inter prediction mode or intra prediction mode), a second syntax element may indicate a quantization coefficient, a third syntax element may indicate configuration of prediction units, and a fourth syntax element may indicate configuration of transform units.

The transcode pipeline 50 may then convert a bin stream, which is representative of syntax elements generated by the main encoding pipeline 48, to a bit stream with one or more syntax elements represented by a fractional number of bits. In some embodiments, the transcode pipeline 50 may compress bins from the bin stream into bits using arithmetic coding. To facilitate arithmetic coding, the transcode pipeline 50 may determine a context model for a bin, which indicates probability of the bin being a "1" or "0," based on previous bins. Based on the probability of the bin, the transcode pipeline 50 may divide a range into two sub-ranges. The transcode pipeline 50 may then determine an encoded bit such that it falls within one of two sub-ranges to select the actual value of the bin. In this manner, multiple bins may be represented by a single bit, thereby improving encoding efficiency (e.g., reduction in size of source image data). After entropy encoding, the transcode pipeline 50 may transmit the encoded image data to an output for transmission, storage, and/or display.

Additionally, the video encoding system 38 may include motion compensated temporal filtering circuitry 66, which may perform further motion vector refinement operations and perform temporal filtering operations on the refined motion vectors received from the main encoding pipeline 48 and the low-resolution pipeline 46. The motion compensated temporal filtering circuitry 66 may receive motion vectors from the main encoding pipeline 48, the low-resolution pipeline 46, or both, and may fetch source pixels and reference pixels based on the received motion vectors. Additionally, the motion compensated temporal filter block 66 may perform motion vector refinement based on the received motion vectors and fetched source pixels and reference pixels. The motion compensated temporal filter block 66 may use the refined motion vectors to perform temporal filtering operations by calculating a weighted average of the source and reference pixels to determine filtered pixel values for the video image data, and transmit the filtered encoded image data to the output for transmission, storage, and/or display. More details regarding the motion compensated temporal filter block 66 as well as operations of the motion compensated temporal filter block 66 (e.g., motion compensated temporal filtering) are described in U.S. patent application Ser. No. 18/101,571, entitled "Systems and Methods for Motion Compensated Temporal Filtering During Image Processing Operation," which is hereby incorporated by reference for all purposes.

Furthermore, the video encoding system 38 may be communicatively coupled to an output. In this manner, the video encoding system 38 may output encoded (e.g., compressed) image data to such an output, for example, for storage and/or transmission. Thus, in some embodiments, the local memory 21, the main memory storage device 22, the network interface 24, the I/O ports 16, the controller memory 44, or any combination thereof may serve as an output.

As described above, the duration provided for encoding image data may be limited, particularly to enable real-time or near real-time display and/or transmission. To improve operational efficiency (e.g., operating duration and/or power consumption) of the main encoding pipeline 48, the low resolution pipeline 46 may include a scaler block 65 and a low resolution motion estimation (ME) block 63. The scaler block 65 may receive image data and downscale the image data (e.g., a coding unit) to generate low-resolution image data. For example, the scaler block 65 may downscale a 32×32 coding unit to one-sixteenth resolution to generate an 8×8 downscaled coding unit. In other embodiments, such as embodiments in which the pre-processing circuitry 19 generates image data (e.g., low-resolution image data) from source image data, the low resolution pipeline 46 may not include the scaler block 65, or the scaler block 65 may not be utilized to downscale image data.

The low resolution motion estimation block 63 may improve operational efficiency by initializing the motion estimation block 52 with candidate inter prediction modes, which may facilitate reducing searches performed by the motion estimation block 52. Additionally, the low resolution motion estimation block 63 may improve operational efficiency by generating global motion statistics that may be utilized by the motion estimation block 52 to determine a global motion vector.

Figure 8:
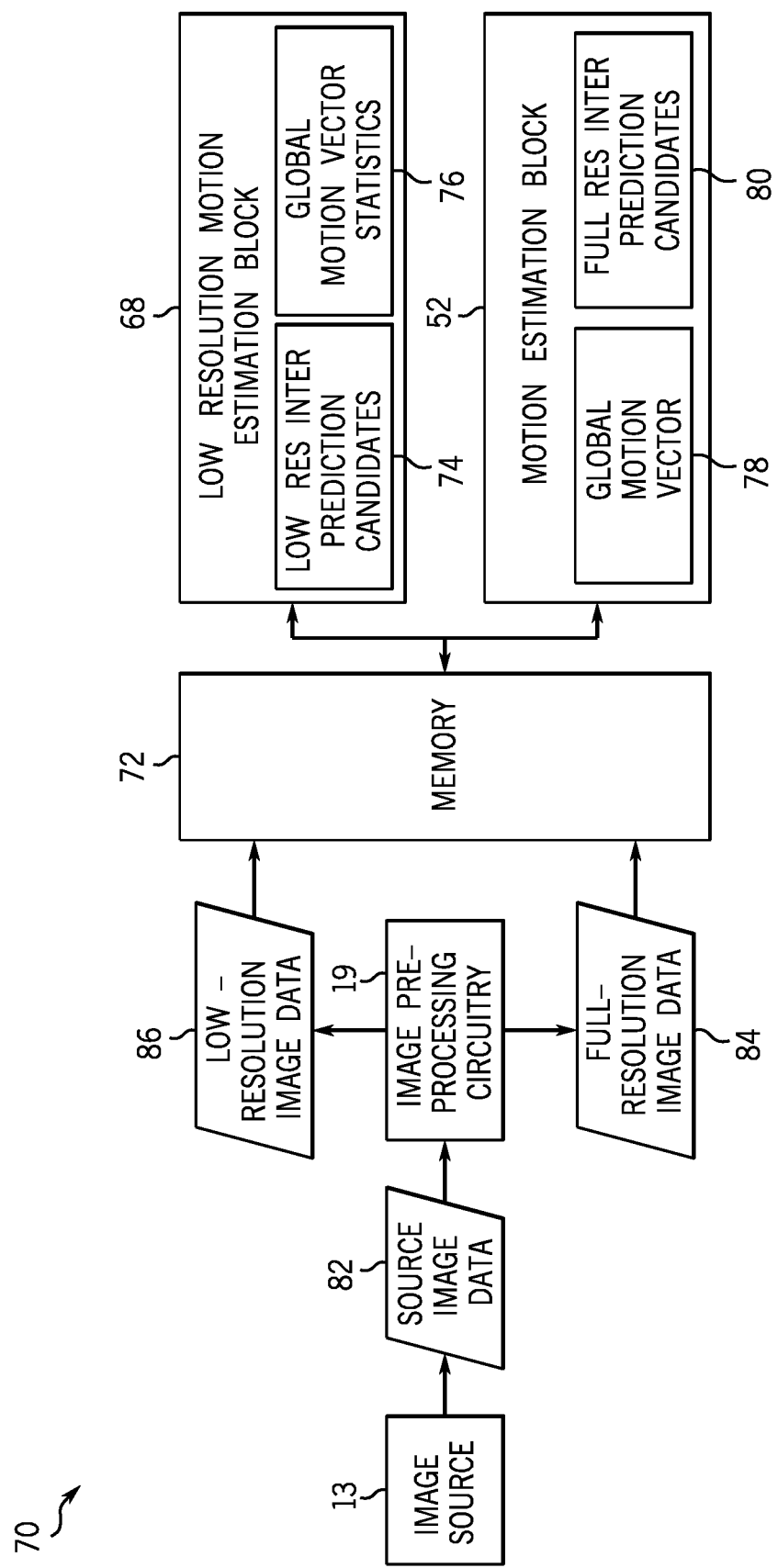
FIG. 8 is a block diagram of a portion of the video encoding system of FIG. 7 including a low resolution motion estimation block and a motion estimation block along with the image sensor and image pre-processing circuitry of FIG. 1, in accordance with an embodiment.

As noted above, the present disclosure relates to encoding image data, which may utilize low-resolution motion estimation techniques. Motion estimation techniques may be utilized on scaled (e.g., downscaled) image data. As described above, scaled image data may be generated by the scaler block 65 of the low-resolution motion pipeline. In other embodiments, the scaled image data may be generated by other circuitry included in the electronic device 10. To help illustrate, FIG. 8 is a block diagram of a portion 70 of the video encoding system 38, which includes the low resolution motion estimation block 63 and the motion estimation block 52 coupled to external memory 72, along with the image sensor 13, the image pre-processing circuitry 19, and various types of image data (e.g., source image data 82, full-resolution image data 84, and low-resolution image data 86). In some embodiments, the external memory 72 may be a tangible, non-transitory, computer-readable medium accessible by the video encoding system 38, for example, to store data and/or retrieve data, such as image data and/or statistics data. Accordingly, in some embodiments, the external memory 72 may be included in the controller memory 44, the local memory 21, or the main memory storage device 22. In other embodiments, the external memory 72 may be a separate storage component dedicated to the video encoding system 38. Furthermore, it should be noted that the image pre-processing circuitry 19 may be included in the video encoding system 38.

The external memory 72 is communicatively coupled to the low resolution motion estimation block 63 and the motion estimation block 52 of the main encoding pipeline 48. In some embodiments, the external memory 72 may provide direct memory access (DMA) that enables the low resolution motion estimation block 63 and the main encoding pipeline 48 to access the external memory 72 relatively independently. Thus, in such embodiments, the low resolution motion estimation block 63 may process image frames in advance of the main encoding pipeline 48, which may enable the low resolution motion estimation block 63 to determine information (e.g., low resolution candidate inter prediction modes and/or motion vector statistics) useful for the main encoding pipeline 48, particularly the motion estimation block 52 and the mode decision block 58.

For example, the low resolution motion estimation block 63 may analyze low resolution image data to determine one or more low resolution inter prediction mode candidates 74, which may be analyzed as full resolution inter prediction mode candidates 80 by the motion estimation block 52. To facilitate improving operational efficiency, in some embodiments, the low resolution motion estimation block 63 may prune the low resolution inter prediction mode candidates 74 before they are evaluated by the motion estimation block 52, for example, to consolidate low resolution inter prediction mode candidates 74 that indicate similar motion vectors.

Additionally or alternatively, the low resolution motion estimation block 63 may determine global motion vector statistics 76 based at least in part on the low resolution inter prediction mode candidates 74. In some embodiments, the global motion vector statistics 76 determined by the low resolution motion estimation block 63 may facilitate image stabilization. Additionally, in some embodiments, the low resolution motion estimation block 63 may determine similar portions of successively displayed images to determine trends in motion, for example, as a global motion vector. Based on the motion trends, successively displayed image frames may be stabilized. In this manner, the low resolution motion estimation block 63 may determine the global motion vector statistics 76 that are useful for improving operational efficiency of the main encoding pipeline 48 and, thus, may facilitate real-time or near real-time transmission and/or display of image data.

Furthermore, the low resolution inter prediction mode candidates 74 and global motion vector statistics 76 may be utilized by the motion estimation block 52 of the video encoding system 38 to determine a global motion vector 78 and full resolution inter prediction mode candidates 80. In some embodiments, the global motion vector 78 may be indicative of motion trends across multiple images and, thus, may be used by the motion estimation block 52 to improve the evaluated full resolution inter prediction mode candidates 80, for example, by offsetting a full resolution inter prediction mode candidate to compensate for the motion trend.

The inter prediction block 54 may determine luma prediction samples and chroma prediction samples by applying each of the full resolution inter prediction mode candidates 80. Additionally, as described above, the mode decision block 58 may consider one or more candidate intra predictions modes, corresponding luma prediction samples, and corresponding luma prediction samples to determine a candidate intra prediction mode, a corresponding luma prediction sample, and corresponding chroma prediction samples for a prediction unit, which the reconstruction block 60 may use to generate reconstructed image data.

Continuing with the discussion of FIG. 8, to help describe an example of how image data may be encoded, the low resolution motion estimation block 63 and the motion estimation block 52 may perform several operations such as determining candidate low resolution inter prediction modes (e.g., via the low resolution motion estimation block 63), determining global motion vector statistics 76 based on the candidate low resolution inter prediction modes (e.g., via the low resolution motion estimation block 63), determining the global motion vector 78 (e.g., via the motion estimation block 52 based on the global motion vector statistics 76), and determining an inter prediction mode based on the global motion vector and the low resolution inter prediction mode candidates 74 (e.g., via the motion estimation block 52). Such operations may be implemented at least in part based on circuit connections formed (e.g., programmed) in the video encoding system 38. Additionally or alternatively, these operations may be implemented at least in part by executing instructions stored in a tangible non-transitory computer-readable medium, such as the controller memory 44, using processing circuitry, such as the controller processor 42. Some image data encoding techniques are described in more detail in U.S. patent application Ser. No. 16/032,925, entitled "Global Motion Vector Video Encoding Systems and Methods," which is hereby incorporated by reference in its entirety for all purposes.

Generally, the operations mentioned above could be performed utilized image data generated from the source image data 82. For instance, as mentioned above, the low resolution motion estimate block 63 may generate downscaled image data from the source image data 82. However, for certain types of source image data 82 (e.g., relatively higher resolution source image data), utilizing the low resolution motion estimation block 63 to scale source image data 82 may be burdensome (e.g., utilize high amounts of power and/or processing resources) and utilize relatively large amounts of the memory 72. To enable more of the resources of the low resolution motion estimation block 63 to be utilized for encoding techniques (e.g., determining low resolution inter prediction mode candidates 74 and global motion vector statistics 76) and to reduce the amount of bandwidth of the memory 72 being utilized, the image pre-processing circuitry 19 may be utilized to generate image data (e.g., full-resolution image data 84 and low-resolution image data 86) from the source image data 182 that can be stored in the memory 72 and utilized by the low resolution motion estimation block 63 and the motion estimation block 52. By doing so, the video encoding system 38 may be able to encode image data more quickly and efficiently. Some techniques for generating the full-resolution image data 84 and low-resolution image data 86 from the source image data 82 that can be stored in the memory 72 and utilized by the low resolution motion estimation block 63 and the motion estimation block 52 are described in more detail in U.S. patent application Ser. No. 17/020,750, entitled "Systems and Methods for Encoding Image Data," which is hereby incorporated by reference in its entirety for all purposes.

As noted above, to encode image data, the low resolution motion estimation block 63 and the motion estimation block 52 may perform several operations such as determining candidate low resolution inter prediction modes (e.g., via the low resolution motion estimation block 63), determining global motion vector statistics 76 based on the candidate low resolution inter prediction modes (e.g., via the low resolution motion estimation block 63), determining the global motion vector 78 (e.g., via the motion estimation block 52 based on the global motion vector statistics 76), and determining an inter prediction mode based on the global motion vector and the low resolution inter prediction mode candidates 74 (e.g., via the motion estimation block 52). It should also be noted that the motion estimation block 52 may utilize low resolution inter prediction mode candidates 74 that the low resolution motion estimation block 63 may generate by performing a recursive search, which is described in more detail in U.S. patent application Ser. No. 18/084,989, which is hereby incorporated in its entirety for all purposes.

Figure 9:
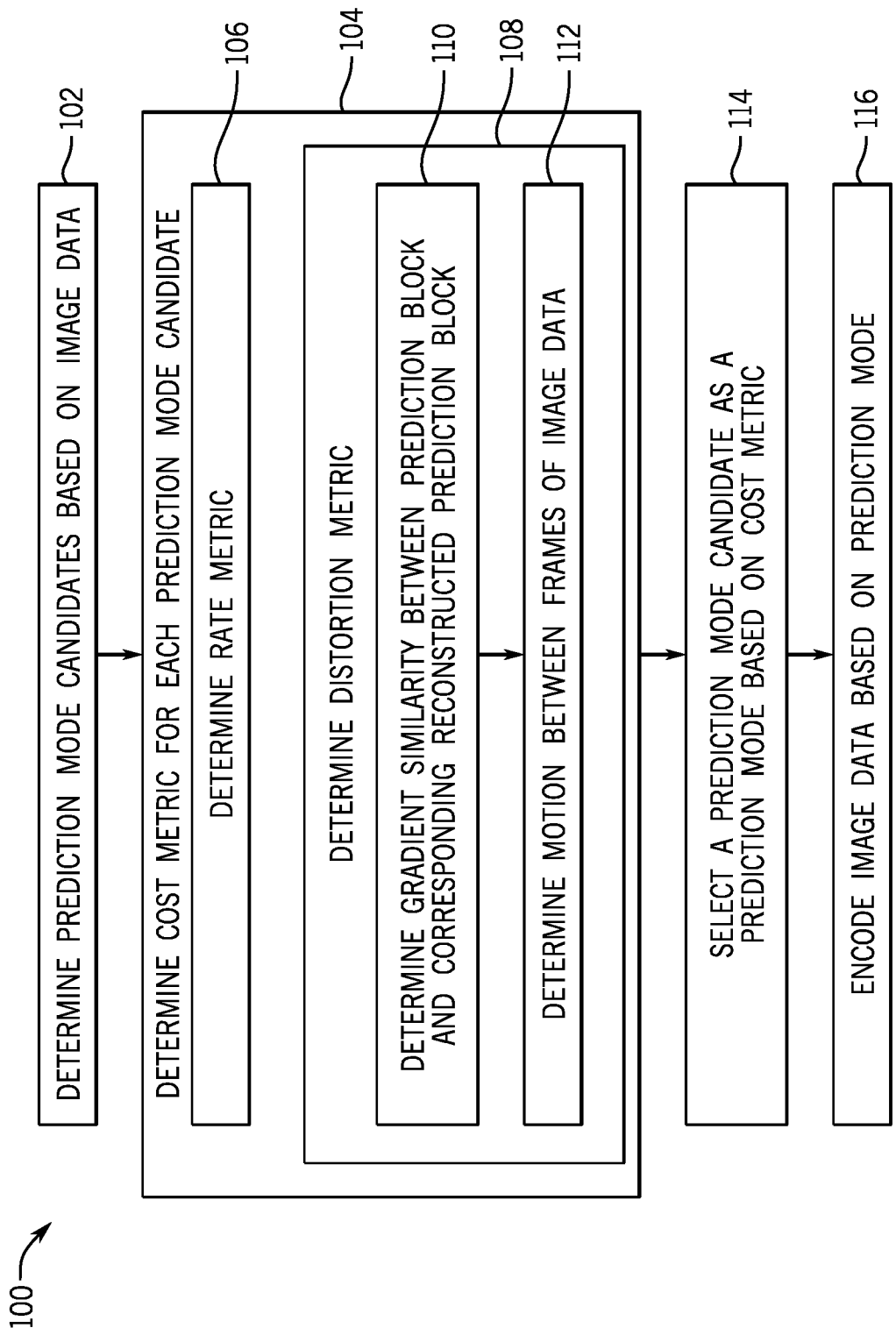
FIG. 9 is a flow diagram of a process for encoding image data, in accordance with an embodiment.

Bearing this in mind, FIG. 9 is a flow diagram of a process 100 for encoding image data. Generally, the process 100 includes determining prediction mode candidates based on image data (process block 102) and determining a cost metric for each prediction mode candidate (process block 104). Determining the cost metric may include determining a rate metric (process sub-block 106) and determining a distortion metric (process sub-block 108). Determining the distortion metric may include determining gradient similarity between a prediction block and a corresponding reconstructed prediction block (process sub-block 110) and determining motion between frames of the image data (process sub-block 112). The process 100 may also include selecting a prediction mode candidate as a prediction mode based on the determined cost metric(s) (process block 114), and encoding the image data based on the prediction mode (process block 116). In some embodiments, the process 100 may be implemented at least in part based on circuit connections formed (e.g., programmed) in the video encoding system 38. Additionally or alternatively, the process 100 may be implemented at least in part by executing instructions stored in a tangible non-transitory computer-readable medium, such as the controller memory 44, using processing circuitry, such as the controller processor 42.

Accordingly, at process block 102, in some embodiments, a controller 40 may instruct the low resolution motion estimation block 63 to determine prediction mode candidates based on image data, such as the source image data 82. For example, the low resolution motion estimation block 63 may analyze low resolution image data to determine one or more low resolution inter prediction mode candidates 74, which may be analyzed as full resolution inter prediction mode candidates 80 by the motion estimation block 52. Additionally, the inter prediction block 54 may determine luma prediction samples and chroma prediction samples by applying each of the full resolution inter prediction mode candidates 80. Additionally, as described above, the mode decision block 58 may consider one or more candidate intra predictions modes, corresponding luma prediction samples, and corresponding luma prediction samples to determine a candidate intra prediction mode, a corresponding luma prediction sample, and corresponding chroma prediction samples for a prediction unit, which the reconstruction block 60 may use to generate reconstructed image data. Accordingly, at process block 102, the prediction mode candidates that are determined may include one or more candidate intra prediction modes, one or more candidate inter prediction modes, or both one or more candidate intra prediction modes and one or more candidate inter prediction modes.

In some embodiments, the prediction mode candidates may be determined based on a downscaled prediction block. For example, the low resolution motion estimation block 63 may process a downscaled coding unit, such as a downscaled luma coding block. Additionally, as described above, a coding unit may include one or more prediction units, such as a luma prediction block and/or a chroma prediction block. The low resolution motion estimation block 62 may process a downscaled luma coding block and one or more downscaled chroma coding blocks.

Figure 10:
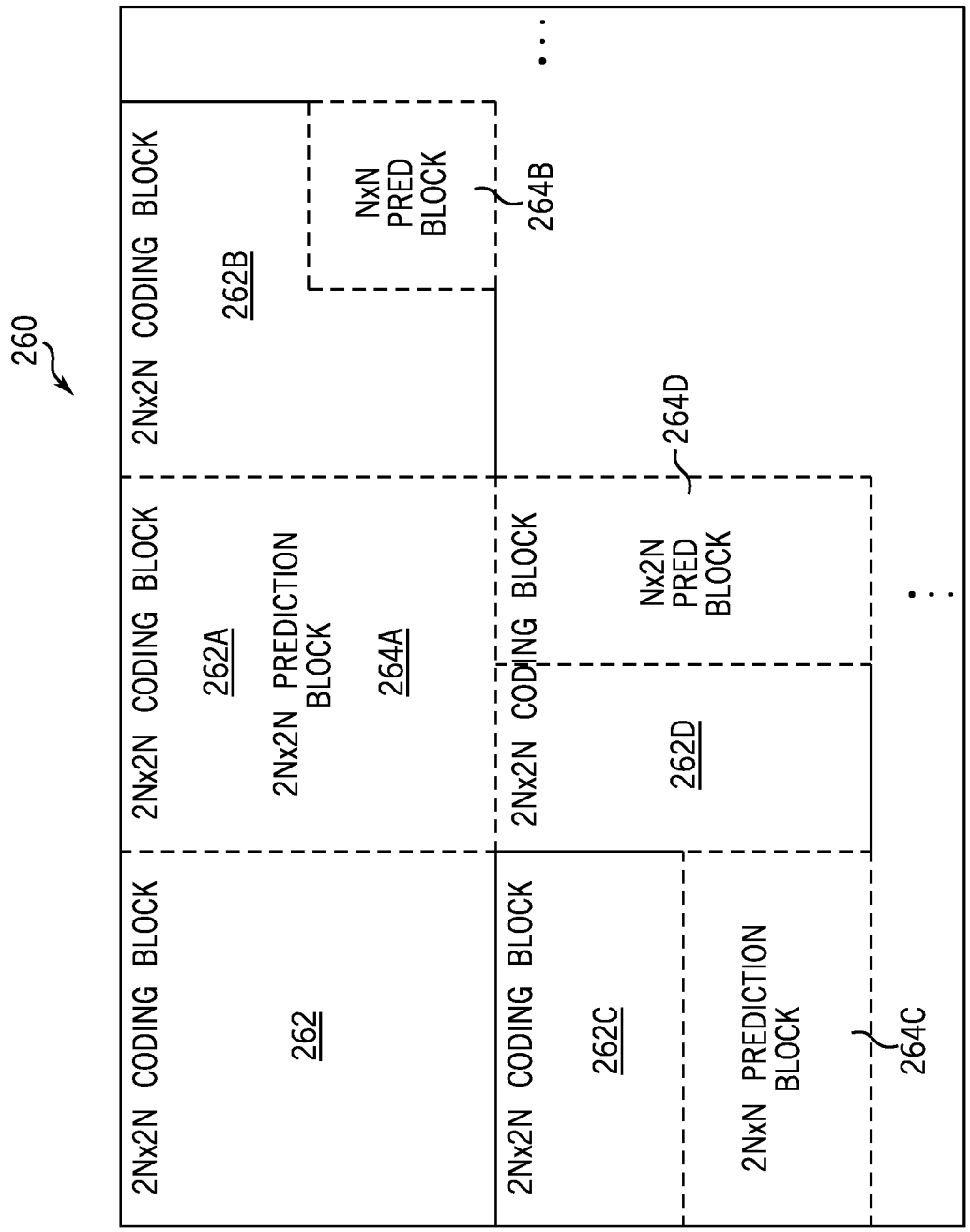
FIG. 10 is a diagrammatic representation of an image divided into coding blocks and prediction blocks, in accordance with an embodiment.

To help illustrate, a diagrammatic representation of an image 260 divided into coding blocks and prediction blocks is shown in FIG. 10. In particular, the image 260 is divided into 2N×2N coding blocks 262. For example, the 2N×2N coding blocks 262 may be 32×32 coding blocks. Additionally, as depicted, each 2N×2N coding block 262 is divided into one or more prediction blocks 264. In one embodiment, luma coding blocks may be 2N×2N coding blocks, while chroma coding blocks may be 2N×N, N×2N, or N×N coding blocks.

In some embodiments, the prediction blocks 264 may be of various sizes or dimensions. For example, a first coding block 262A may include a 2N×2N prediction block 264A, a second coding block 262B may include four N×N prediction blocks 264B, a third coding block 262C may include two 2N×N prediction blocks 264C, and a fourth coding block 262D may include two N×2N prediction blocks 264D. In other words, when the 2N×2N coding blocks 262 are 32×32 coding blocks, the 2N×2N prediction block 264A may be a 32×32 prediction block, the N×N prediction blocks 264B may each be a 16×16 prediction block, the 2N×N prediction blocks 264C may each be a 32×16 prediction block, and the N×2N prediction blocks 264D may each be a 16×32 prediction block.

Additionally, as noted above, a low resolution motion estimation block 63 may downscale coding blocks and, thus, prediction blocks within the coding blocks. In some embodiments, the low resolution motion estimation block 63 may downscale (e.g., down sample or sub-sample) in a horizontal direction and/or a vertical direction. For example, when downscaled by a factor of four in both the horizontal direction and the vertical direction, a 32×32 (e.g., 2N×2N) coding block may result in an 8×8 downscaled coding block. Additionally, a 16×16 (e.g., N×N) prediction block may result in a 4×4 downscaled prediction block, a 32×16 (e.g., 2N×N) prediction block may result in an 8×4 downscaled prediction block, and a 16×32 (e.g., N×2N) prediction block may result in a 4×8 downscaled prediction block. In this manner, a low resolution motion estimation block 63 may determine one or more downscaled prediction blocks.

Returning to the process 100 of FIG. 9, the low resolution motion estimation block 63 may perform a first pass of a search on downscaled image data corresponding with a reference image to identify one or more downscaled reference samples, which may be used to predict the downscaled prediction block. In some embodiments, the downscaled reference image data may be previously downscaled source image data, for example, corresponding to other image frames. In other words, the downscaled source image data corresponding with the downscaled prediction block may be searched when the low resolution motion estimation block 63 subsequently processes another image.

In any case, in some embodiments, the low resolution motion estimation block 63 may search the downscaled reference image data to determine one or more downscaled reference samples that are similar to luma or chroma (e.g., in the first mode of operation) or luma (e.g., in the second mode of operation) of the downscaled prediction block. In some embodiments, the low resolution motion estimation block 63 may determine a degree of matching between a downscaled reference sample and the downscaled source image data corresponding with the downscaled prediction block. For example, the low resolution motion estimation block 63 may determine a match metric, such as sum of absolute difference (SAD) between luma of the downscaled prediction block and luma of the downscaled reference sample.

As described above, a coding unit may include one or more luma prediction blocks and one or more chroma prediction blocks, which may each be encoded using the same prediction technique. Additionally, as described above, a coding unit may utilize various prediction mode configurations (e.g., number, size, location, and/or prediction modes for the one or more luma prediction blocks and chroma prediction blocks). Thus, in such embodiments, the low resolution motion estimation block 63 may determine one or more downscaled reference samples for variously sized downscaled prediction blocks in a downscaled coding block.

After a downscaled reference sample is determined, the low resolution motion estimation block 63 may determine a motion vector (e.g., a low resolution motion vector) that indicates location of the downscaled reference sample relative to the downscaled prediction block. As described above, a motion vector may indicate spatial position of a reference sample in the reference image frame relative to a prediction unit in the current image frame. Additionally, the reference sample may include blocks of image data that form a prediction block. Accordingly, in some embodiments, the low resolution motion estimation block 63 may determine a motion vector by determining a horizontal offset (e.g., mvX) and a vertical offset (e.g., mvY) between a prediction unit corresponding with the downscaled luma prediction block (or downscaled chroma block) and a reference sample corresponding with a downscaled reference sample. In this manner, the low resolution motion estimation block 63 may determine one or more low resolution inter prediction mode (e.g., motion vector and reference index) candidates 74.

At process block 104, the image processing circuitry 20 (e.g., utilizing the pipelines of the video encoding system 38) may determine a cost metric for each of the prediction mode candidates determined at process block 102. The cost metric may be a rate-distortion metric. In some embodiments, the rate-distortion metric may be determined by summing a first product obtained by multiplying an estimated rate that indicates number of bits expected to be used to indicate encoding parameters and a first weighting factor for the estimated rate and a second product obtained by multiplying a distortion metric (e.g., sum of squared difference) resulting from the encoding parameters and a second weighting factor for the distortion metric.

In other embodiments, the cost metric may be determined without utilizing a sum of squared difference for the distortion metric. For example, in some cases, when utilizing a sum of squared difference, which is related to peak-to-noise ratio (PSNR), coding decisions (which may favor PSNR) may not correlate well with subject quality (e.g., as judged by a viewer of image content). Accordingly, in some embodiments, to determine the cost metric, a rate metric may be determined (at process sub-block 106). The rate metric may be an estimated rate that indicates number of bits expected to be used to indicate encoding parameters.

Additionally, at sub-process block 108, the image processing circuitry 20 (e.g., utilizing the pipelines of the video encoding system 38) may determine a distortion metric for each of the prediction mode candidates. To determine the distortion metric, the image processing circuitry 20 may, at sub-process block 110, determine gradient similarity between a prediction block corresponding to a reconstructed prediction block. Gradient similarity represents the spatial activity and may be defined by or as a sum a first absolute difference of a first magnitude of a horizontal filter applied to the prediction block and the reconstructed prediction block and a second absolute difference of a second magnitude of a vertical filter applied to the prediction block and the reconstructed prediction block. The horizontal and vertical filters may be 3×3 Sobel filters that are applied to an original block and reconstructed block. To avoid accessing additional pixel over block boundaries, the actual block size the 3×3 Sobel kernels may be (N−2)×(N−2), where N is equal to eight, sixteen, and/or thirty-two. Accordingly, a horizontal gradient may be a first absolute difference of a first magnitude of a horizontal filter applied to the prediction block and the reconstructed prediction block. A vertical gradient may be a second magnitude of a vertical filter applied to the prediction block and the reconstructed prediction block. The gradient similarity may be defined as the sum of the first absolute difference and the second absolute difference. Accordingly, the larger the gradient similarity between a prediction block and a reconstructed prediction block, the lower the distortion.

It should be noted that, in other embodiments, other size kernels (e.g., Sobel kernels) may be utilized. For example, in another embodiment, a 5×5 Sobel kernel may be utilized. Thus, any suitable size Sobel kernel may be utilized in conjunction with the techniques described herein. Furthermore, in some embodiments, the gradient similarity may be applied (or utilized) in conjunction with more than the prediction block. That is, gradient similarity may overlap the prediction block. In this manner, discontinuities introduced by performing prediction techniques, transforms, and/or quantizations may be accounted for. As such, the image processing circuitry 20 may account for discontinuities introduced by performing prediction techniques, transforms, and/or quantizations on image data (or data generated therefrom) based on and/or by utilizing the gradient similarity (which may be determined at process sub-block 110).

To determine the distortion metric, at process sub-block 112, the image processing circuitry 20 (e.g., utilizing the pipelines of the video encoding system 38) may also determine motion between frames of image data. In particular, the image processing circuitry 20 may determine the motion between the two frames of the image data based on a motion vector (e.g., generated by the low resolution motion estimation block 63) indicative of a difference between a first frame of the two frames and a second frame of the two frames. For example, the motion may be equated using the one or more (0,0) motion vector sums of absolute difference within valid frame boundaries. In some embodiments, the motion may be set to zero (e.g., when determining a candidate intra prediction mode). The distortion metric may be determined by summing the gradient similarity and the determined motion.

The cost metric (e.g., rate-distortion metric) may be determined by summing the distortion metric and a product obtained by multiplying the rate metric (e.g., an estimated rate that indicates number of bits expected to be used to indicate encoding parameters) and a first weighting factor for the rate matric. In another embodiment, the cost metric may be determined by summing a first product and a second product in which the first product is obtained by multiplying the rate metric and a first weighting factor for the rate metric, and the second product is obtained by multiplying the distortion metric by a second weighting factor for the distortion metric. In some embodiments, the weighting of the distortion metric and/or the rate metric in the rate-distortion metric may be determined (and adjusted) based on the motion (e.g., as determined as process sub-block 112). For instance, the relatively higher the motion is, the relatively higher the rate metric may be weighted. For example, in the embodiment in which there is a single weighting factor for the rate metric, the relatively higher the motion is, the relatively higher the weighting factor may be. Conversely, the relatively lower the motion is, the relatively lower the weighting factor may be. As another example, in the embodiment in which there is a first weighting factor for the rate metric and a second weighting factor for the distortion metric, the relatively higher the motion is, the relatively higher the first weighting factor may be and/or the relatively lower the second weighting factor may be. The relatively lower the motion is, the relatively lower the first weighting factor may be and/or the relatively higher the second weighting factor may be. As such, the rate-distortion metric may place more weight on distortion (as opposed to rate) when there is relatively little motion, and the rate-distortion metric may place more weight on distortion (as opposed to rate) when there are relatively larger amounts of motion. Accordingly, the weighting of the rate metric and/or the weighting of the distortion metric may be determined and/or adjusted based on motion when determining the rate-distortion metric.

At process block 114, the mode decision block 58 may select a prediction mode candidate as a prediction mode based on the cost metric. For example, the mode decision block 58 may select the prediction mode candidate that has the lowest cost as the prediction mode. Selection of the prediction mode may include determining or selecting a size of a coding unit. For example, in one embodiment, the size may be 8×8, 16×16, or 32×32. Furthermore, at process block 116, image data may be encoded utilizing the prediction mode determined at process block 114.

Accordingly, the technical effects of the present disclosure include improving operational efficiency of a video encoding system used to encode (e.g., compress) source image data as well as improving the accuracy of motion estimation. Accordingly, video encoding systems utilizing the techniques described herein may have enhanced accuracy, efficiency, or both.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A video encoding system, configured to:
   determine, based on image data, a distortion metric that is associated with a difference between the image data and reconstructed image data for a prediction mode candidate based on:
   gradient similarity between a prediction block of the image data and a reconstructed prediction block of the reconstructed image data generated based on the image data; and
   motion between two frames of the image data;
   select, from a plurality of prediction mode candidates, the prediction mode candidate as a prediction mode based at least in part on the distortion metric; and
   encode the image data based on the prediction mode.

2. The video encoding system of claim 1, wherein the video encoding system is configured to determine the gradient similarity based on:
   a first absolute difference of a first magnitude of a horizontal filter applied to the prediction block and the reconstructed prediction block; and
   a second absolute difference of a second magnitude of a vertical filter applied to the prediction block and the reconstructed prediction block.

3. The video encoding system of claim 1, wherein the video encoding system is configured to determine the motion between the two frames of the image data based on a motion vector indicative of a difference between a first frame of the two frames and a second frame of the two frames.

4. The video encoding system of claim 3, wherein the video encoding system is configured to:
   determine a rate metric for the prediction mode candidate;
   determine a rate-distortion metric based on the rate metric, the distortion metric, and the motion; and
   select the prediction mode candidate based on the rate-distortion metric.

5. The video encoding system of claim 4, wherein the video encoding system is configured to determine the rate-distortion metric by weighting the rate metric relatively more heavily than the distortion metric the relatively higher the weight is.

6. The video encoding system of claim 1, wherein the image data comprises image data captured by an image sensor, downscaled image data, and full-resolution image data, wherein the downscaled image data and full-resolution image data are generated from the image data captured by the image sensor; and
   the video encoding system is configured to encode the image data by encoding the full-resolution image data based on the prediction mode.

7. The video encoding system of claim 1, wherein the prediction mode candidate comprises a candidate inter prediction mode or a candidate intra prediction mode.

8. The video encoding system of claim 1, wherein the video encoding system is included in an electronic device.

9. The video encoding system of claim 1, wherein the video encoding system is configured to determine the distortion metric without determining a sum of squared difference.

10. A non-transitory computer-readable medium comprising instructions that, when executed by processing circuitry, cause the processing circuitry to:
- determine, based on image data, a distortion metric that is associated with a difference between the image data and reconstructed image data for a prediction mode candidate based on:
  - gradient similarity between a prediction block of the image data and a reconstructed prediction block of the reconstructed image data generated based on the image data; and
  - motion between two frames of the image data;
- select, from a plurality of prediction mode candidates, the prediction mode candidate as a prediction mode based at least in part on the distortion metric; and
- encode the image data based on the prediction mode.

11. The non-transitory computer-readable medium of claim 10, wherein the instructions, when executed, cause the processing circuitry to determine the gradient similarity based on:
- a first absolute difference of a first magnitude of a horizontal filter applied to the prediction block and the reconstructed prediction block; and
- a second absolute difference of a second magnitude of a vertical filter applied to the prediction block and the reconstructed prediction block.

12. The non-transitory computer-readable medium of claim 11, wherein the instructions, when executed, cause the processing circuitry to determine the motion between the two frames of the image data based on a motion vector indicative of a difference between a first frame of the two frames and a second frame of the two frames.

13. The non-transitory computer-readable medium of claim 12, wherein the instructions, when executed, cause the processing circuitry to determine the motion in:
- a first manner for a first type of prediction mode candidate; and
- a second manner different than the first manner for a second type of prediction mode candidate.

14. The non-transitory computer-readable medium of claim 13, wherein:
- the first type of prediction mode candidate comprises an intra prediction mode candidate; and
- the second type of prediction mode candidate comprises an inter prediction mode candidate.

15. The non-transitory computer-readable medium of claim 10, wherein the instructions, when executed, cause the processing circuitry to determine the distortion metric without determining a sum of squared difference.

16. The non-transitory computer-readable medium of claim 15, wherein the instructions, when executed, cause the processing circuitry to:
- determine a rate-distortion metric based on the distortion metric; and
- select the prediction mode candidate based on the rate-distortion metric.

17. A computer-implemented method, comprising:
- determining, via processing circuitry and based on image data, a distortion metric that is associated with a difference between the image data and the reconstructed image data for a prediction mode candidate based on:
  - gradient similarity between a prediction block of the image data and a reconstructed prediction block of the reconstructed image data generated based on the image data; and
  - motion between two frames of the image data;
- selecting, via the processing circuitry and from a plurality of prediction mode candidates, the prediction mode candidate as a prediction mode based at least in part on the distortion metric; and
- encoding, via the processing circuitry, the image data based on the prediction mode.

18. The computer-implemented method of claim 17, comprising:
- determining, via the processing circuitry, the gradient similarity based on:
  - a first absolute difference of a first magnitude of a horizontal filter applied to the prediction block and the reconstructed prediction block; and
  - a second absolute difference of a second magnitude of a vertical filter applied to the prediction block and the reconstructed prediction block; and
- determining, via the processing circuitry, the motion between the two frames of the image data based on a motion vector indicative of a difference between a first frame of the two frames and a second frame of the two frames.

19. The computer-implemented method of claim 18, wherein the horizontal filter and the vertical filter comprise Sobel filters.

20. The computer-implemented method of claim 17, comprising accounting, based on the gradient similarity, for one or more discontinuities introduced to the image data.

* * * * *